United States Patent [19]

Whitted, III et al.

[11] Patent Number: 5,442,775
[45] Date of Patent: Aug. 15, 1995

[54] TWO CLOCK MICROPROCESSOR DESIGN WITH STALL

[75] Inventors: Graham B. Whitted, III, Irvine; Hsiao-Shih Chang, Orange; James A. Kane, Newport Beach, all of Calif.

[73] Assignee: Meridian Semiconductor, Inc., Irvine, Calif.

[21] Appl. No.: 193,235

[22] Filed: Feb. 8, 1994

[51] Int. Cl.[6] .............................................. G06F 1/10
[52] U.S. Cl. ............................ 395/550; 364/DIG. 2; 364/926.92; 364/925.6; 364/950.5; 364/934.4
[58] Field of Search ........................................ 395/550; 364/DIG. 2 MS File

[56] References Cited

U.S. PATENT DOCUMENTS 4,748,559  5/1988  Smith et al. .................... 395/550
5,325,521  6/1994  Koyama et al. ............... 395/550 X

*Primary Examiner*—Thomas M. Heckler
*Attorney, Agent, or Firm*—Knobbe, Martens, Olson & Bear

[57] ABSTRACT

A circuit and method suspend the operation of a CPU of a microprocessor while a memory control unit (MCU) of the microprocessor performs certain operations for the CPU. The circuit is used to generate two internal clock signals from an external clock signal generated off-chip. The first internal clock signal is used to control the MCU and runs continuously. The second internal clock signal is used to control the CPU. During MCU operations requiring wait states, a stall circuit stalls the second internal clock to suspend the operation of the CPU and to thereby prevent CPU register values from changing. The circuit and method eliminate the need for certain data circulation logic within the CPU.

2 Claims, 3 Drawing Sheets

TWO CLOCK MICROPROCESSOR DESIGN WITH STALL

FIELD OF THE INVENTION

This invention relates to microprocessors having an internal memory control unit. In particular, this invention relates to a technique for halting the central processing unit of a microprocessor while the memory control unit performs certain operations.

BACKGROUND OF THE INVENTION

Microprocessors commonly employ an internal memory control unit ("MCU") to control accesses to cache and external memory. The central processing unit ("CPU") of the microprocessor issues memory access commands to the MCU. The MCU responds by performing the requested operation, and returning the requested data, if any, to the CPU.

For certain types of operations such as memory reads, the CPU must WAIT for a variable number of clock cycles before the MCU completes the requested operation and returns the requested data to the CPU. Handshaking is therefore required to signal to the CPU that the requested operation is complete, and/or that the requested data is being driven on an internal bus between the MCU and CPU during the current clock cycle.

During the variable time period in which the CPU waits for the MCU to retrieve and return the requested data, it is necessary to preserve the status of some or all of the registers internal to the CPU. These registers are typically comprise flip-flops that are clocked by a CPU clock. Unless each flip-flop is effectively disabled during clock cycles for which the CPU waits for the MCU to complete the requested operation, data will be clocked through the flip-flops and CPU register values will change.

Microprocessors such as the 486 preserve the status of the CPU registers by using a WAIT signal generated by the MCU. During clock cycles for which the WAIT signal is asserted by the MCU, or "wait states," the data values held by individual CPU flip-flops are circulated. Data circulation is accomplished by using a multiplexer to select a feedback path to connect the data output of each flip-flop to its respective input. This effectively disables the CPU registers by preventing the data values held by the CPU flip-flops from changing.

One problem with this approach results from the need to run enable signals to each of the numerous flip-flops within the CPU, and from the need to include extra logic to circulate the data held by each flip-flop. An additional problem results from the need to account for skew between the clock signal and enable signal at each flip-flop location. The design of the CPU would therefore be significantly simplified if the enable signal lines and circulation logic associated with each flip-flop were eliminated.

SUMMARY OF THE INVENTION

The present invention is a circuit and method for suspending the operation of the CPU while the MCU performs an external memory read or other operation for the CPU. A circuit internal to the microprocessor chip generates two separate clock signals—a first clock signal for controlling the MCU, and a second clock signal for controlling the CPU. The circuit includes a stall circuit, for holding the second clock signal to the CPU high while the WAIT signal is asserted, to thereby suspend the operation of the CPU. Register values internal to the CPU are thereby maintained during wait states without the use of data circulation logic. Thus, the numerous multiplexers and corresponding enable signal lines associated with the CPU flip-flops are eliminated, simplifying the design. The design is further simplified by eliminating the need to account for skew between the clock signals and the enable signals heretofore used to control each latch. Additionally, the power consumption of the microprocessor is reduced during wait states.

The circuit of the present invention comprises a first input connected to a clock signal line. The clock signal line is connected to an external clock source that provides an external clock signal. A second input is connected to a WAIT signal line. The WAIT signal line is connected to the MCU. The WAIT signal line provides a WAIT signal generated by the MCU for indicating that the MCU is performing an operation for the CPU that requires the CPU to temporarily suspend processing. A clock generation circuit generates a first internal clock signal that controls the MCU and that generates a second internal clock signal that controls the CPU. The first internal clock signal and the second internal clock signal are generated from the external clock signal on the first input. A clock stall circuit inhibits transitions of the second internal clock signal when the WAIT signal is asserted while the first clock signal continues to operate to thereby suspend the operation of the CPU while the MCU is performing an operation for the CPU.

BRIEF DESCRIPTION OF THE DRAWINGS

In the drawings, like reference numbers indicate identical or functionally similar elements. Additionally, the left-most digit of a reference number identifies the drawing in which the reference number first appears.

DETAILED DESCRIPTION OF THE INVENTION

Figure 1:
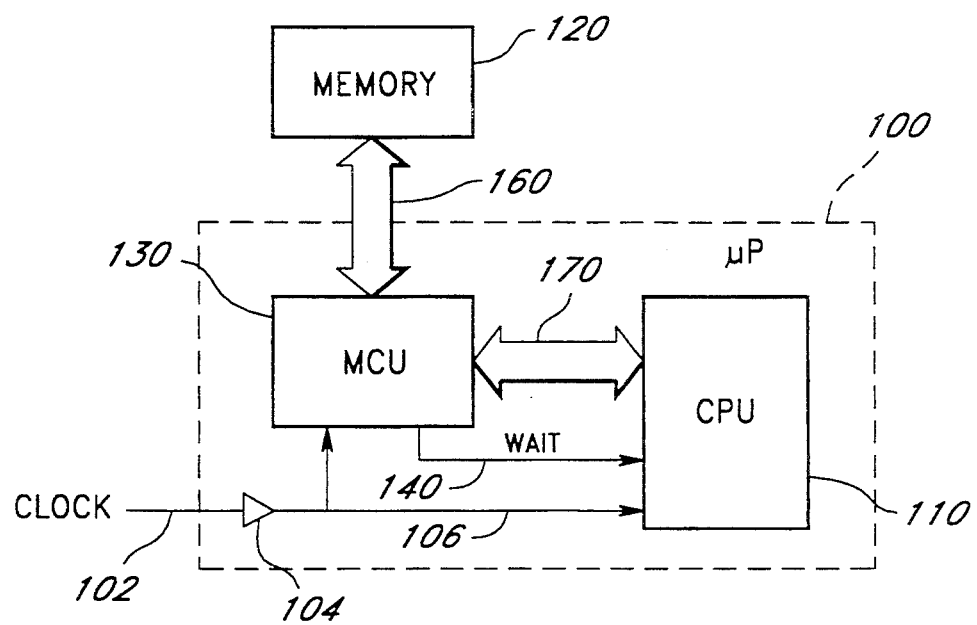
FIG. 1 illustrates the clocking technique used by existing microprocessors such as the 486 microprocessor.
Figure 2:
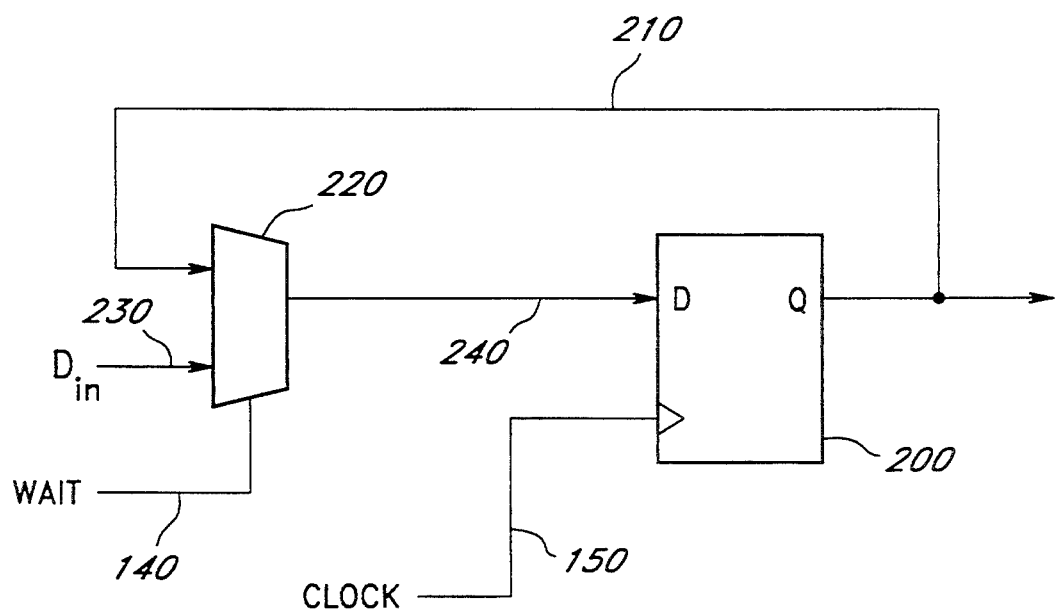
FIG. 2 illustrates the circuitry used by existing microprocessors for disabling flip-flops internal to the CPU during wait states.

A brief description of the technique used by existing microprocessors to disable CPU flip-flops during wait states will initially be provided with reference to FIGS. 1 and 2.

FIG. 1 illustrates the internal clocking technique used by microprocessors such as the 486. A single clock signal on a line 102 comes on-chip and passes through a clock buffer 104 to an internal line 106. The clock signal on the line 106 is used clock a CPU 110 and an MCU 130. The MCU 130 is connected to an external memory array 120 ("memory") by a bus 160. The MCU 130 is also connected internally to the CPU 110 by a bus 170.

The CPU 110 requests data from memory 120 by issuing a memory read command to the MCU 130 on the bus 170. The MCU initially determines whether the requested data is present in an internal cache (not shown). If the data is present in cache, the MCU returns the requested read data on the bus 170 on the clock cycle following the cache read. If the requested data is not present in cache, the MCU 130 performs an external memory read operation on the bus 160. Since the memory read operation may take several clock cycles, the MCU 130 asserts a WAIT signal on the line 140, to signal to the CPU 110 that the requested data will not be returned on the current clock cycle. The WAIT signal is used by the CPU to prevent registers (not shown) internal to the CPU from changing value in response to the clock signal. The MCU 140 continues to assert the WAIT signal on each clock cycle until the requested data is available to send to the CPU 110 via the bus 170. The MCU 130 thus effectively freezes the status of the CPU 110 while performing an external memory read by generating wait states on clock cycles for which the requested data is not available.

FIG. 2 illustrates how the WAIT signal is used by the CPU 110 to prevent registers internal to the CPU 110 from changing value on clock cycles for which the WAIT signal is asserted. A flip-flop 200 representing one bit of a register internal to the CPU 110 has a data input 240 connected to the output of a multiplexer 220. The multiplexer selects between a data input line 230 and a feedback line 210, such that the multiplexer selects the feedback line 210 when the WAIT signal on the line 140 is asserted. The clock input of the flip-flop 200 is connected to the clock signal line 106.

When the WAIT signal on the line 140 is asserted, the output of the flip-flop 200 is fed back through the feedback path 210 and multiplexer 220 as the data input 240 to the flip-flop 200. When the WAIT signal is not asserted, the data input signal on the line 230 passes through the multiplexer 220 to the data input 240 of the flip-flop 200. Thus, the circuit of FIG. 2 prevents the output of the flip-flop 200 from changing on clock cycles for which the WAIT signal is asserted, thereby effectively disabling the flip-flop.

For microprocessors such as the 486, the CPU typically contains several hundred single-bit flip-flops organized as multiple-bit data and status registers or for storing state values, for example, which must be disabled while the WAIT signal is asserted. For the clocking scheme of FIG. 1, wherein the CPU 110 is continuously clocked throughout memory read operations, it is necessary to include a 2:1 multiplexer for each of the several hundred flip-flops, adding to the complexity of the CPU 110 circuit. It is also necessary to route the WAIT signal line 140 or an equivalent disable signal to every multiplexer, making the layout of the CPU 110 circuit more difficult.

The layout of the CPU 110 is further complicated by the need to take into consideration the skew between the clock and the WAIT signals caused by propagation delay. The clock signal line 150 and WAIT signal line 140 must be connected to every flip-flop/multiplexer pair such that the WAIT signal will propagate to each multiplexer before the corresponding flip-flop is clocked.

Figure 3:
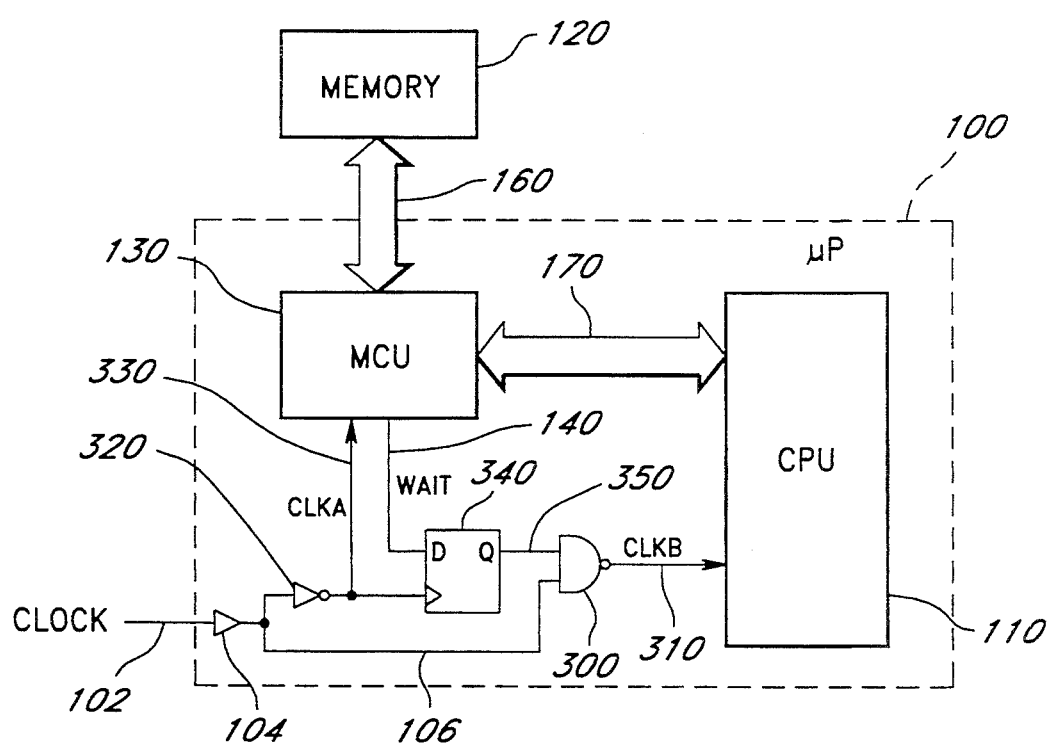
FIG. 3 illustrates the circuit of the present invention for stalling a clock to the CPU during wait states.

FIG. 3 illustrates the internal clocking scheme of the present invention. This clocking scheme eliminates the above-mentioned problems by using two separate clock signals, CLKA and CLKB, to control the MCU 130 and the CPU 110 respectively. The circuit uses the WAIT signal to stall the CLKA clock during wait states, to thereby suspend the operation of the CPU 110 until the memory access is completed. The CLKA and CLKB signals are generated internal to the microprocessor 100 chip.

Referring to FIG. 3, the CLKA clock signal is generated on the line 330 using an inverter 320 having its input connected to the clock signal line 106. The CLKA signal line 330 is connected to the MCU 130. A flip-flop 340 is clocked by the CLKA signal on the line 330 and is used to latch the WAIT signal on the line 140. A CLKB signal is generated on the line 310 from the latched WAIT signal on the line 350 and the clock signal on the line 106 using a NAND gate 300. (The use of a NAND gate presumes that the WAIT signal is active-low). The CLKB signal line 310 is connected to the CPU 110.

Figure 4:
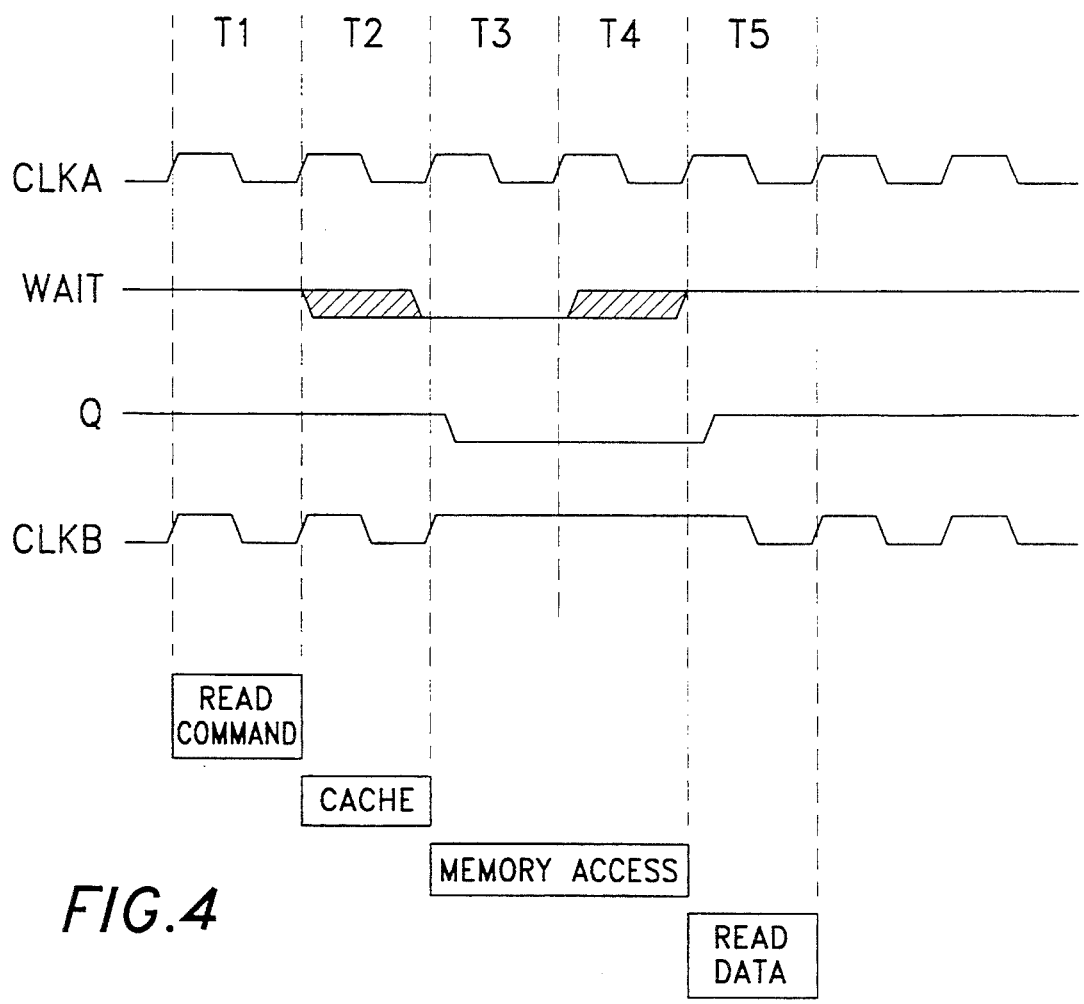
FIG. 4 is a timing diagram of a memory read with a cache miss for the circuit of FIG. 3.

The operation of the circuit of FIG. 3 during a memory read operation with a cache miss will now be described with reference to FIG. 4. FIG. 4 is a timing diagram showing the relative timing of the CLKA signal on the line 330, the WAIT signal on the line 140, the output of the flip-flop 340 on the line 350 (denoted as "Q"), and the CLKB signal on the line 310. The diagram represents an external memory read operation requiring two wait states (i.e., two cycles for which the WAIT signal is asserted by the MCU 130). The number of wait states required for an MCU 130 operation will typically vary depending upon the type of operation being performed by the MCU 130 and the speed of the memory 120.

On a first clock cycle (T1) the CPU 110 issues a memory read command to the MCU 130 on the bus 170. The MCU 130 responds on a second clock cycle (T2) by checking cache for the requested read data. Assuming the data is not found in cache, the MCU 130 asserts the WAIT signal on the line 140. On the following rising edge of CLKA on the line 330 at the beginning of a third clock cycle (T3), the low value on the WAIT signal line 140 is clocked to the output of the flip-flop 340. The input to the NAND gate on the line 350 thus goes low during the third clock cycle, holding the CLKB signal line 310 in a high or "stalled" state.

The CLKB signal line 310 remains high during a fourth clock cycle (T4) until a high value on the WAIT signal line 140 is clocked to the output of the flip-flop 340 at the beginning of a fifth clock cycle (T5). The operation of the CPU 110 is thereby suspended during the third and fourth clock cycles while the MCU 130 accesses memory 120. The MCU 130 produces the requested read data on the bus 170 during the fifth clock cycle, and the data is clocked into the CPU by the CLKB signal on the line 310.

Figure 5:
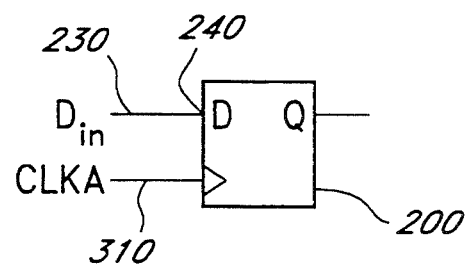
FIG. 5 illustrates the simplified connection of an internal CPU flip-flop for the circuit of FIG. 3.

Advantageously, the circuit of FIG. 3 eliminates the need for the multiplexer circuit of FIG. 2, and additionally eliminates the need to route the WAIT signal line 140 or an equivalent enable signal to the numerous flip-flops contained within the CPU 110. Thus, the individual flip-flops in registers and elsewhere internal to the CPU 110 can be connected as shown in FIG. 5, with the data input line 230 connected directly to the data input 240 of the flip-flop 200. This significantly simplifies the design of the CPU 110 by eliminating several hundred 2:1 multiplexers 220 associated with the flip-flops, and by eliminating the need to take into account any skew between the clock and WAIT signals. The design also reduces the power consumption of the CPU 110 by halting the sequential logic elements of the CPU 110 during wait states.

The clock stall technique described above for halting the CPU 110 is not limited to external memory read operations, but can be used whenever the CPU 110 must wait for an MCU operation to complete before the CPU can proceed. For example, an 486-compatible microprocessor can use the clock stall technique during the following additional events:

1. Translation lookaside buffer update;
2. Second page address generation on a page boundary cross;
3. Cache busy (flush or invalidate cycle);
4. Flush or write FIFO buffer; and
5. Floating point unit write.

The stall technique and benefits achieved for these operations are the same as described for the external memory read operation.

Furthermore, the scope of the present is not intended to be limited to clock signals which are stalled in a high state. The circuit of FIG. 3 can easily be modified to produce a clock signal which stalls in a low state to produce similar benefits.

Finally, it should be recognized that the clock stall technique described above is not limited to operations involving a CPU and MCU. As one skilled in the art will recognize, the technique is useful whenever a first logic block must wait for a second logic block to complete an operation before proceeding.

The circuit and method described for stalling a clock to temporarily suspend the operation of a CPU have been presented by way of example only, and not limitation. Thus, the breadth and scope of the present invention should not be limited by any of the above-described exemplary embodiments, but should be defined only in accordance with the following claims and their equivalents.

What is claimed is:

1. A circuit for suspending the operation of a central processing unit (CPU) of a microprocessor while a memory control unit (MCU) of said microprocessor performs an operation for said CPU, said circuit being internal to said microprocessor, said circuit comprising:

a first input connected to a clock signal line, said clock signal line connected to an external clock source that provides an external clock signal;

a second input connected to a WAIT signal line, said WAIT signal line connected to said MCU, said WAIT signal line providing a WAIT signal generated by said MCU for indicating that said MCU is performing an operation for said CPU that requires said CPU to temporarily suspend processing;

a clock generation circuit that generates a first internal clock signal that controls said MCU and that generates a second internal clock signal that controls said CPU, said first internal clock signal and said second internal clock signal being generated from said external clock signal on said first input; and a clock stall circuit that inhibits transitions of said second internal clock signal when said WAIT signal is asserted while said first clock signal continues to operate, to thereby suspend the operation of said CPU while said MCU is performing an operation for said CPU.

2. A circuit for suspending the operation of a CPU of a microprocessor as defined in claim 1, combined with a memory connected to said MCU, said memory external to said microprocessor, said memory storing a data value used for said operation.

* * * * *